United States Patent
Yang

(10) Patent No.: US 8,131,805 B2
(45) Date of Patent: Mar. 6, 2012

(54) MULTILEVEL ANTI-SPAM SYSTEM AND METHOD WITH LOAD BALANCING

(75) Inventor: Lianghua Yang, Kitchener (CA)

(73) Assignee: Research In Motion Limited, Waterloo, Ontario (CA)

(*) Notice: Subject to any disclaimer, the term of this patent is extended or adjusted under 35 U.S.C. 154(b) by 1299 days.

(21) Appl. No.: 11/364,176

(22) Filed: Mar. 1, 2006

(65) Prior Publication Data
US 2007/0208853 A1    Sep. 6, 2007

(51) Int. Cl.
*G06F 15/16* (2006.01)

(52) U.S. Cl. ........ 709/206; 709/207; 709/223; 709/224; 709/225; 709/203; 370/392; 370/400; 370/406; 455/453; 726/3; 726/15; 726/22; 726/11; 726/13

(58) Field of Classification Search .................. 709/238, 709/203, 206–207, 223–228; 370/392, 400, 370/406, 338; 718/108, 105; 455/453; 726/3, 726/15, 22, 11, 13
See application file for complete search history.

(56) References Cited

U.S. PATENT DOCUMENTS

| | | | |
|---|---|---|---|
| 6,654,787 B1 * | 11/2003 | Aronson et al. | 709/206 |
| 6,732,157 B1 * | 5/2004 | Gordon et al. | 709/206 |
| 2002/0116463 A1 * | 8/2002 | Hart | 709/206 |
| 2004/0019651 A1 * | 1/2004 | Andaker | 709/207 |
| 2004/0167964 A1 * | 8/2004 | Rounthwaite et al. | 709/206 |
| 2004/0210640 A1 * | 10/2004 | Chadwick et al. | 709/207 |
| 2005/0015455 A1 * | 1/2005 | Liu | 709/207 |
| 2005/0074019 A1 * | 4/2005 | Handforth et al. | 370/406 |
| 2005/0210106 A1 * | 9/2005 | Cunningham | 709/206 |
| 2005/0246420 A1 * | 11/2005 | Little, II | 709/204 |
| 2006/0047768 A1 * | 3/2006 | Gellens | 709/207 |
| 2006/0048218 A1 * | 3/2006 | Lingafelt et al. | 726/11 |
| 2006/0075052 A1 * | 4/2006 | Oostendorp | 709/206 |

FOREIGN PATENT DOCUMENTS

WO    03/003214 A    1/2003

* cited by examiner

*Primary Examiner* — Quang N. Nguyen
*Assistant Examiner* — Benjamin M Thieu
(74) *Attorney, Agent, or Firm* — Rowand Intellectual Property Law

(57) ABSTRACT

There is disclosed a system and method for managing spam within an email message stream. In an embodiment, a method comprises defining a plurality of anti-spam filter levels where each anti-spam filter level includes at least one anti-spam module configurable for filtering spam messages. An anti-spam request including a user preferred anti-spam filter level is generated and communicated to the preferred anti-spam filter level. The anti-spam request is implemented on at least one anti-spam module in the preferred anti-spam filter level based on at least one predetermined criterion. If the anti-spam request cannot be implemented at the preferred anti-spam filter level, the anti-spam request is implemented on at least one anti-spam module at another anti-spam filter level.

15 Claims, 10 Drawing Sheets

| | List of Current Filters | | |
|---|---|---|---|
| Local: 15 | Intermediate: 50 | | Upper: 100 |
| | 2006-01-20 10:02a | SpammerA | Upper |
| | 2006-01-20 11:30a | SpammerB | Upper |
| | 2006-08-01 10:00a | SpammerC | Local |
| | 2005-12-20 11:00a | SpammerD | Intermediate |
| | 2006-01-01 11:30a | SpammerE | Upper |

FIG. 8G — 800G

MULTILEVEL ANTI-SPAM SYSTEM AND METHOD WITH LOAD BALANCING

FIELD OF THE INVENTION

The present invention relates generally to the field of wireless data communications systems, and more specifically to the management of spam messages.

BACKGROUND

Spam is undesirable for many reasons. Spam messages may be carriers of viruses (e.g. worms, Trojan horses, etc.) that may damage application software or the operating system, reduce system performance, or compromise user privacy by surreptitiously capturing personal information or tracking and reporting usage habits. As well, in certain operating environments, such as a wireless communications network, spam messages forwarded to a mobile communications device may incur significant network usage charges (e.g. based on bandwidth usage, elapsed time, or message count), or roaming charges (i.e. when the communications device is being used on a wireless network other than that of the local service provider).

Even with the introduction and widespread use of various techniques for filtering spam, with the seemingly ever-increasing volume of spam messages, managing spam messages on mobile communications devices can be a laborious and time-consuming task for users of those devices. Spam messages received at mobile communications devices may also consume limited and valuable resources on the device. Thus, what is needed is a more effective system and method of managing spam, especially in a wireless operating environment.

BRIEF DESCRIPTION OF THE DRAWINGS

In the figures which illustrate exemplary embodiments of the invention:

FIGS. 8A to 8G show illustrative user interface screens for making anti-spam requests in accordance with various embodiments;

DETAILED DESCRIPTION

As noted above, the present invention relates generally to the field of wireless data communications systems, and more specifically to the management of spam messages.

Figure 1:
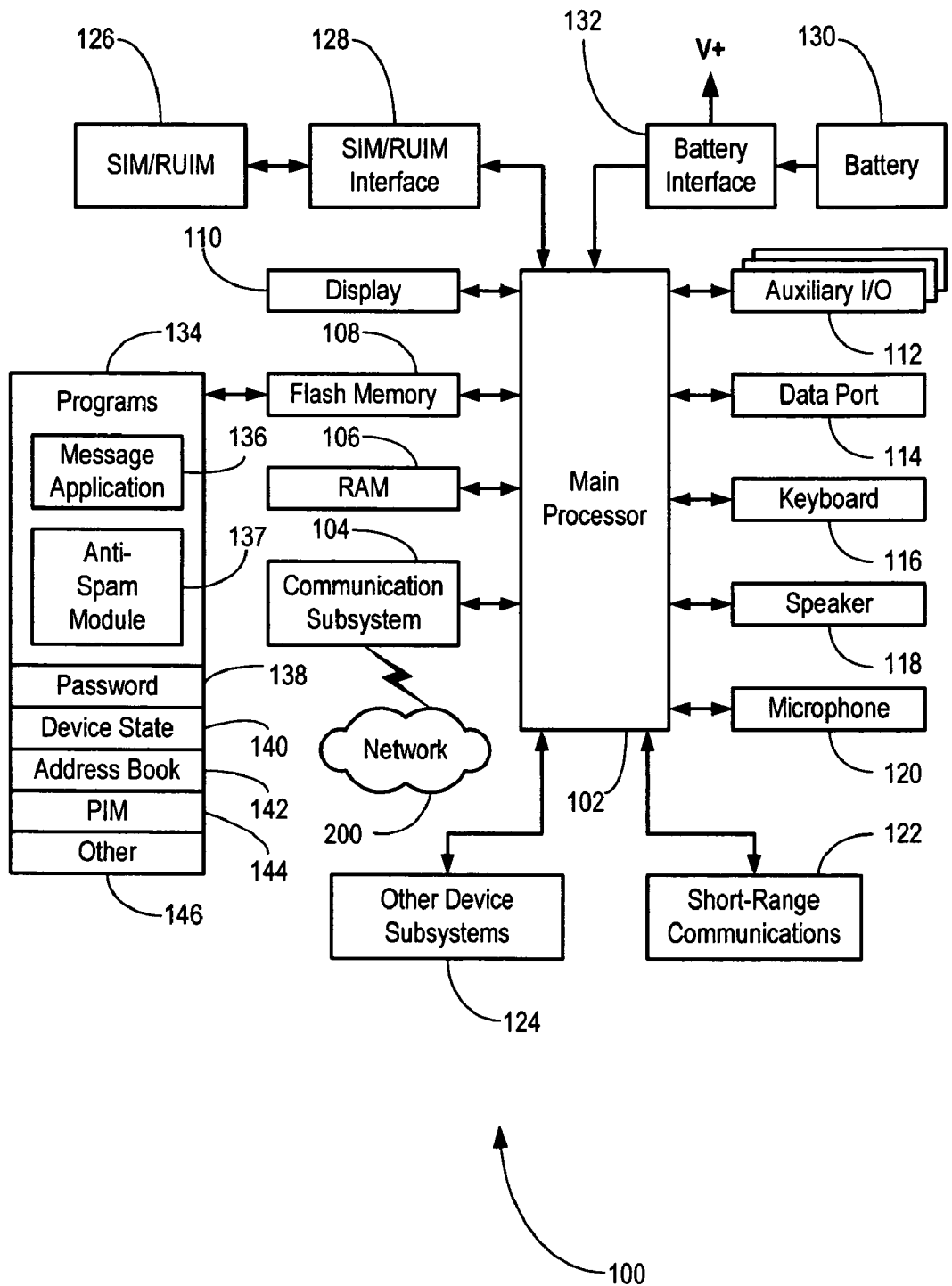
FIG. 1 is a schematic block diagram of an illustrative mobile communications device.

In an embodiment, the invention may be practiced with a mobile communications device in a wireless operating environment. Shown in FIG. 1 is a schematic block diagram of illustrative mobile communications device 100. The communications device 100 may comprise a number of components, including a main processor 102 which controls the overall operation of communications device 100. Communication functions, including data and voice communications, may be performed through a communication subsystem 104. The communication subsystem 104 may receive messages from and send messages to a wireless network 200. In this illustrative embodiment of the communications device 100, the communication subsystem 104 may be configured in accordance with the Global System for Mobile Communication (GSM) and General Packet Radio Services (GPRS) standards. Presently, the GSM/GPRS wireless network is widely used, although it is expected that these standards will be superseded eventually by Enhanced Data GSM Environment (EDGE) and Universal Mobile Telecommunications Service (UMTS). Other standards are still being defined, but it is believed that they will have similarities to the network behaviour described herein, and it will also be understood by persons skilled in the art that the embodiments described herein are intended to use any other suitable standards that may be developed in the future.

In the illustrative example in FIG. 1, the wireless link connecting the communication subsystem 104 with the wireless network 200 represents one or more different Radio Frequency (RF) channels, operating according to defined protocols specified for GSM/GPRS communications. With newer network protocols, these channels may be capable of supporting both circuit switched voice communications and packet switched data communications.

In alternative implementations, other wireless networks may be associated with the communications device 100. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE, UMTS, HSDPA (High Speed Downlink Packet Access) and HSUPA (High Speed Uplink Packet Access). Other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 may also interact with additional subsystems such as a random access memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the communications device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. Operating system software used by the main processor 102 is typically stored in a persistent store such as the flash memory 108, which may alternatively be a read-only memory (ROM) or similar storage element (not shown). Those skilled in the art will appreciate that the operating system, specific device applications, or parts thereof, may be temporarily loaded into a volatile store such as the RAM 106.

The communications device 100 may send and receive communication signals over the wireless network 200 after required network registration or activation procedures have been completed. Network access may be associated with a subscriber or user of the communications device 100. To identify a user, the communications device 100 may require a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a user of the communications device 100 and to personalize the communications device 100, among other things. Without the SIM card 126, the communications device 100 is not fully operational for communication with the wireless network 200. By inserting the SIM card/RUIM 126 into the SIM/RUIM interface 128, a user can access all subscribed services. Services may include: web browsing and messaging such as email, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the user, the SIM card/RUIM 126 contains some user parameters such as an International Mobile Subscriber Identity (IMSI). An advantage of using the SIM card/RUIM 126 is that a user is not necessarily bound by any single physical communications device. The SIM card/RUIM 126 may store additional user information for a communications device as well, including datebook (or calendar) information and recent call information. Alternatively, user identification information can also be programmed into the flash memory 108.

The communications device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communications device 100. Although current technology makes use of a battery, future technologies such as micro fuel cells may provide the power to the communications device 100.

The main processor 102, in addition to its operating system functions, enables execution of software applications 134 on the communications device 100. The subset of software applications 134 that control basic device operations, including data and voice communication applications, will normally be installed on the communications device 100 during its manufacture.

The software applications 134 may include a message application 136. The message application 136 can be any suitable software program that allows a subscriber or user of the communications device 100 to send and receive electronic messages. Various alternatives exist for the message application 136 as is well known to those skilled in the art. Messages that have been sent or received by the user are typically stored in the flash memory 108 of the communications device 100 or some other suitable storage element in the communications device 100. In an alternative embodiment, some of the sent and received messages may be stored remotely from the device 100 such as in a data store of an associated host system that the communications device 100 communicates with.

The software applications 134 may also include an anti-spam module 137 for managing spam in accordance with various embodiments, as will be described in detail further below.

Another program that may be executed by the communications device 100 is a password approval module 138 that may provide approval for user passwords. The password approval module 138 may execute a password approval method to determine whether the user password specified by the user of the communications device 100 is approved.

The communications device 100 may further include a device state module 140, an address book 142, a Personal Information Manager (PIM) 144, and other modules 146. The device state module 140 may provide persistence, i.e. the device state module 140 ensures that important device data is stored in persistent memory, such as the flash memory 108, so that the data is not lost when the communications device 100 is turned off or loses power.

The address book 142 may provide information for a list of contacts for the user. For a given contact in the address book, the information can include the name, phone number, work address and email address of the contact, among other information.

The other modules 146 may include a configuration module (not shown) as well as other modules that can be used in conjunction with the SIM/RUIM interface 128.

The PIM 144 may have functionality for organizing and managing data items of interest to a user, such as, but not limited to, email, calendar events, voice mails, appointments, and task items. A PIM application has the ability to send and receive data items via the wireless network 200. PIM data items may be seamlessly integrated, synchronized, and updated via the wireless network 200 with the communications device user's corresponding data items stored and/or associated with a host computer system. This functionality creates a mirrored host computer on the communications device 100 with respect to such items. This can be particularly advantageous when the host computer system is the communications device user's office computer system.

Additional applications may also be loaded onto the communications device 100 through at least one of the wireless network 200, the auxiliary I/O subsystem 112, the data port 114, the short-range communications subsystem 122, or any other suitable device subsystem 124. This flexibility in application installation increases the functionality of the communications device 100 and may provide enhanced on-device functions, communication-related functions, or both. For example, secure communication applications may enable electronic commerce functions and other such financial transactions to be performed using the communications device 100.

The data port 114 enables a subscriber or user to set preferences through an external device or software application and extends the capabilities of the communications device 100 by providing for information or software downloads to the communications device 100 other than through a wireless communication network. The alternate download path may, for example, be used to load an encryption key onto the communications device 100 through a direct and thus reliable and trusted connection to provide secure device communication.

The data port 114 can be any suitable port that enables data communication between the communications device 100 and another computing device. The data port can be a serial or a parallel port. In some instances, the data port 114 can be a USB port that includes data lines for data transfer and a supply line that can provide a charging current to charge the battery 130 of the communications device 100.

The short-range communications subsystem 122 provides for communication between the communications device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an email message, or web page download will be processed by the communication subsystem 104 and input to the main processor 102. The main processor 102 will then process the received signal for output to the display 110 or alternatively to the auxiliary I/O subsystem 112. A subscriber or user may also compose data items, such as email messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the communications device 100 is substantially similar, except that the received signals are output to the speaker 118, and signals for transmission are generated by the microphone 120. Alternative voice or audio I/O subsystems, such as a voice message recording subsystem, can also be implemented on the communications device 100. Although voice or audio signal output is accomplished primarily through the speaker 118, the display 110 can also be used to provide additional information such as the identity of a calling party, duration of a voice call, or other voice call related information.

Figure 2:
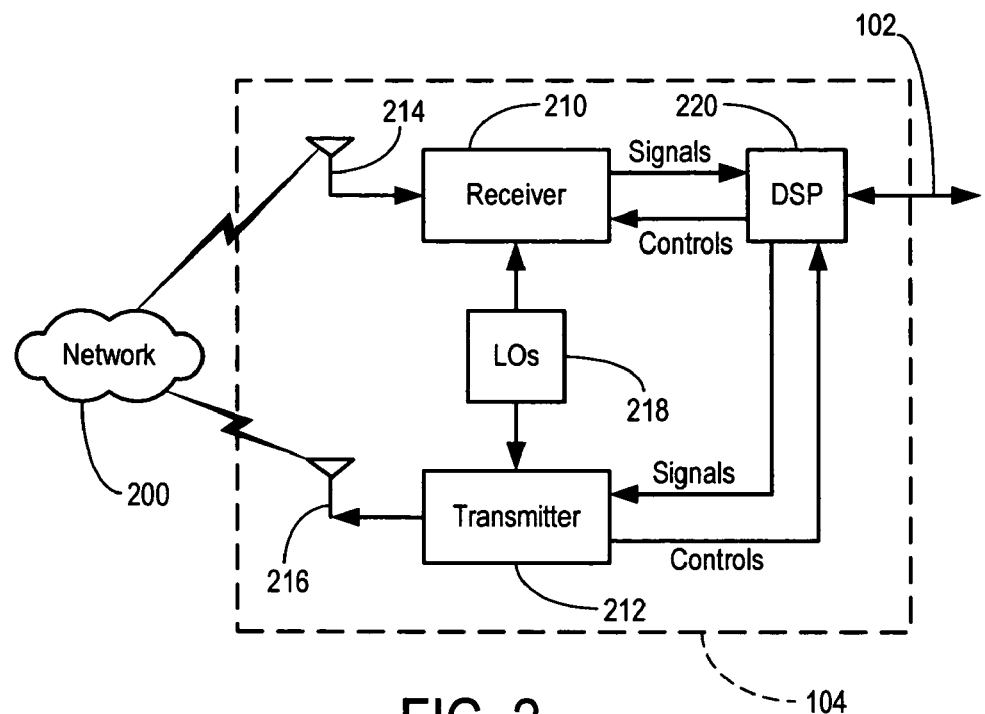
FIG. 2 is a schematic block diagram of a communication subsystem component of the communications device of FIG. 1.

Referring now to FIG. 2, a block diagram of the communication subsystem component 104 of FIG. 1 is shown. The communication subsystem 104 may comprise a receiver 210 and a transmitter 212, as well as associated components such as one or more embedded or internal antenna elements 214, 216, Local Oscillators (LOs) 218, and a processing module such as a Digital Signal Processor (DSP) 220. As will be apparent to those skilled in the field of communications, the particular design of the communication subsystem 104 is dependent upon the communication network with which the communications device 100 is intended to operate. Thus, it should be understood that the design illustrated in FIG. 2 serves only as one example.

Signals received by the antenna 214 through the wireless network 200 are input to the receiver 210, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 220. In a similar manner, signals to be transmitted are processed, including modulation and encoding, by the DSP 220. These DSP-processed signals are input to the transmitter 212 for digital-to-analog (D/A) conversion, frequency up conversion, filtering, amplification and transmission over the wireless network 200 via the antenna 216. The DSP 220 not only processes communication signals, but also provides for receiver and transmitter control. For example, the gains applied to communication signals in the receiver 210 and transmitter 212 can be adaptively controlled through automatic gain control algorithms implemented in the DSP 220.

The wireless link between the communications device 100 and the wireless network 200 can contain one or more different channels, typically different RF channels, and associated protocols used between the communications device 100 and the wireless network 200. An RF channel is a limited resource that must be conserved, typically due to limits in overall bandwidth and limited battery power of the communications device 100.

When the communications device 100 is fully operational, the transmitter 212 is typically keyed or turned on only when it is transmitting to the wireless network 200 and is otherwise turned off to conserve resources. Similarly, the receiver 210 is periodically turned off to conserve power until it is needed to receive signals or information (if at all) during designated time periods.

Figure 3:
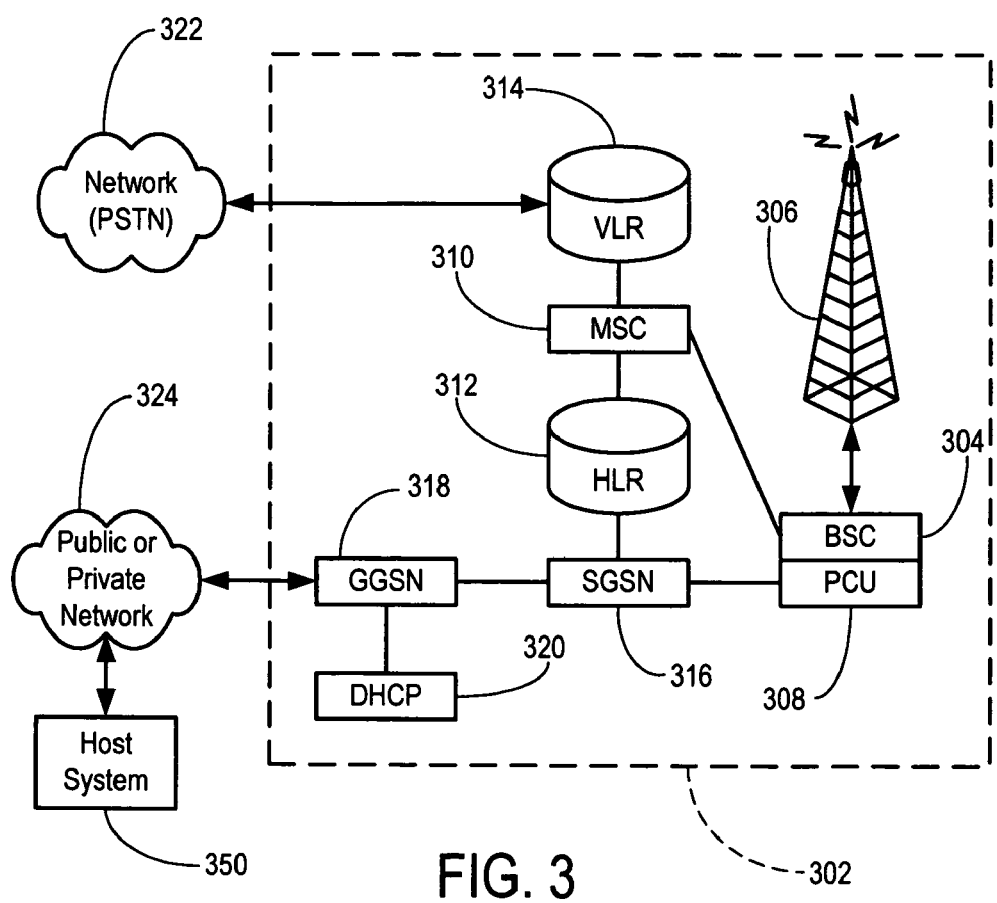
FIG. 3 is a schematic block diagram of an illustrative node of a wireless network with which the communications device of FIG. 1 may communicate.

Referring now to FIG. 3, a block diagram of an exemplary implementation of a node of the wireless network 200 is shown as 302. In practice, the wireless network 200 comprises one or more nodes 302. The communications device 100 communicates with the node 302. In the exemplary implementation of FIG. 3, the node 302 is configured in accordance with General Packet Radio Service (GPRS) and Global Systems for Mobile (GSM) technologies. The node 302 includes a base station controller (BSC) 304 with an associated tower station 306, a Packet Control Unit (PCU) 308 added for GPRS support in GSM, a Mobile Switching Center (MSC) 310, a Home Location Register (HLR) 312, a Visitor Location Registry (VLR) 314, a Serving GPRS Support Node (SGSN) 316, a Gateway GPRS Support Node (GGSN) 318, and a Dynamic Host Configuration Protocol (DHCP) 320. This list of components is not meant to be an exhaustive list of the components of every node 302 within a GSM/GPRS network, but rather a list of components that are commonly used in communications through the wireless network 200.

In a GSM network, the MSC 310 is coupled to the BSC 304 and to a landline network, such as a Public Switched Telephone Network (PSTN) 322 to satisfy circuit switching requirements. The connection through PCU 308, SGSN 316 and GGSN 318 to the public or private network (Internet) 324 (also referred to herein generally as a shared network infrastructure) represents the data path for GPRS capable communications devices. In a GSM network extended with GPRS capabilities, the BSC 304 also contains a Packet Control Unit (PCU) 308 that connects to the SGSN 316 to control segmentation, radio channel allocation and to satisfy packet switched requirements. To track communications device location and availability for both circuit switched and packet switched management, the HLR 312 is shared between the MSC 310 and the SGSN 316. Access to the VLR 314 is controlled by the MSC 310.

The station 306 is a fixed transceiver station. The station 306 and BSC 304 together form the fixed transceiver equipment. The fixed transceiver equipment provides wireless network coverage for a particular coverage area commonly referred to as a "cell". The fixed transceiver equipment transmits communication signals to and receives communication signals from communications devices within its cell via the station 306. The fixed transceiver equipment normally performs such functions as modulation and possibly encoding and/or encryption of signals to be transmitted to the communications device 100 in accordance with particular, usually predetermined, communication protocols and parameters, under control of its controller. The fixed transceiver equipment similarly demodulates and possibly decodes and decrypts, if necessary, any communication signals received from the communications device 100 within its cell. The communication protocols and parameters may vary between different nodes. For example, one node may employ a different modulation scheme and operate at different frequencies than other nodes.

For all communications devices 100 registered with a specific network, permanent configuration data such as a user profile is stored in the HLR 312. The HLR 312 also contains location information for each registered communications device and can be queried to determine the current location of a communications device. The MSC 310 is responsible for a group of location areas and stores the data of the communications devices currently in its area of responsibility in the VLR 314. Further, the VLR 314 also contains information on communications devices that are visiting other networks. The information in the VLR 314 includes part of the permanent communications device data transmitted from the HLR 312 to the VLR 314 for faster access. By moving additional information from a remote HLR 312 node to the VLR 314, the amount of traffic between these nodes can be reduced so that voice and data services can be provided with faster response times and at the same time require less use of computing resources.

The SGSN 316 and GGSN 318 are elements added for GPRS support; namely packet switched data support, within GSM. The SGSN 316 and MSC 310 have similar responsibilities within the wireless network 200 by keeping track of the location of each communications device 100. The SGSN 316 also performs security functions and access control for data traffic on the wireless network 200. The GGSN 318 provides Internetworking connections with external packet switched networks and connects to one or more SGSN's 316 via an Internet Protocol (IP) backbone network operated within the network 200. During normal operations, a given communications device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 320 to be connected to the GGSN 318. There are many mechanisms for dynamic IP assignment, including using a combination of a Remote Authentication Dial-In User Service (RADIUS) server and DHCP server. Once the GPRS Attach is complete, a logical connection is established from the communications device 100, through the PCU 308, and the SGSN 316 to an Access Point Node (APN) within the GGSN 318. The APN represents a logical end of an IP tunnel that can either access direct Internet compatible services or private network connections. The APN also represents a security mechanism for the wireless network 200, insofar as each communications device 100 must be assigned to one or more APNs and the communications devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunnelling methods such as IP over IP as in the case with some IPSecurity (IPsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the communications device 100 is not using its PDP Context, the PDP Context can be de-allocated and the IP address returned to the IP address pool managed by the DHCP server 320.

Figure 4:
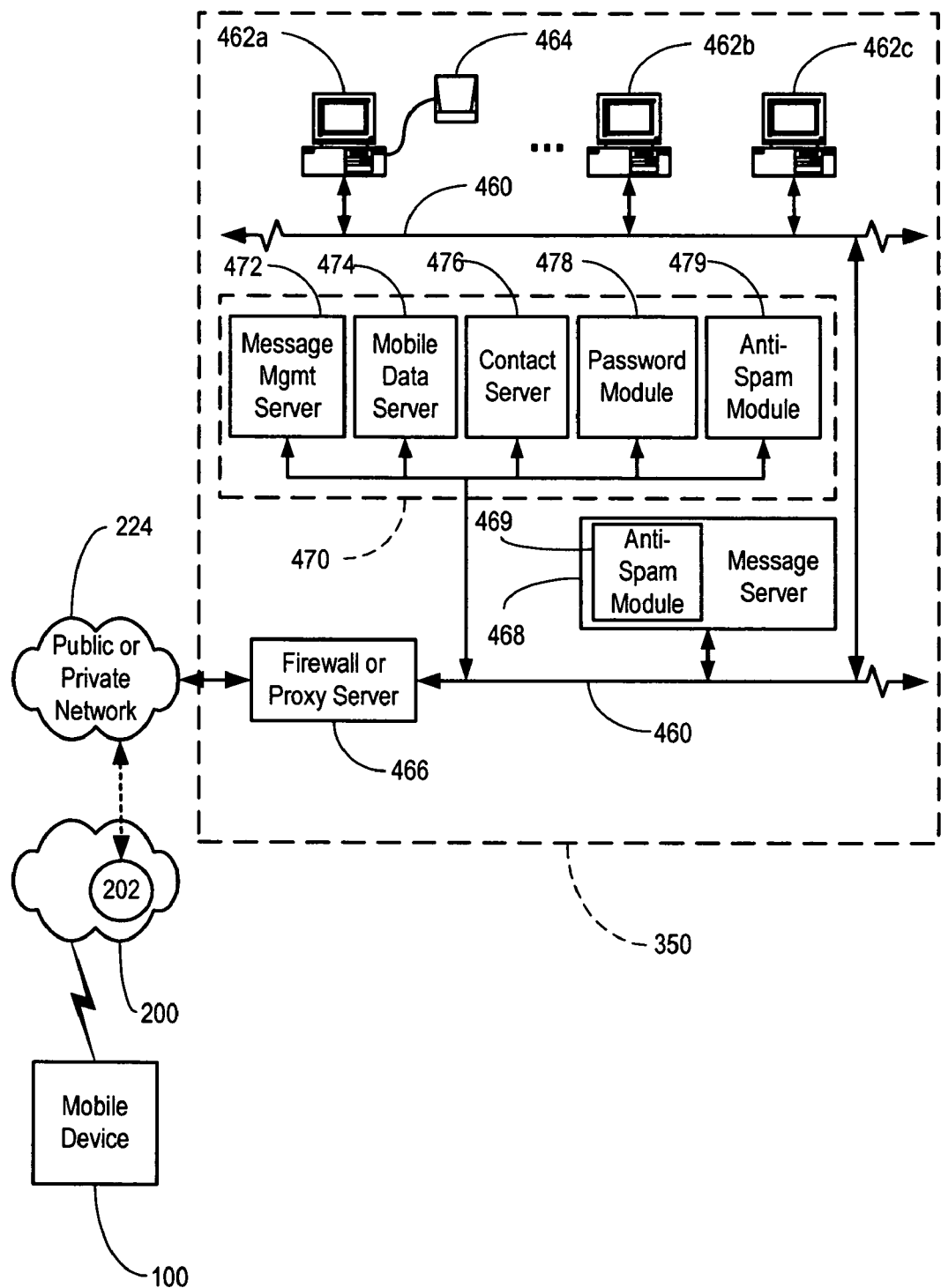
FIG. 4 is a schematic block diagram of an illustrative host system with which the communications device of FIG. 1 may communicate.

Referring now to FIG. 4, shown therein is a block diagram illustrating components of an exemplary configuration of a host system 350. In one instance, the host system 350 can be a corporate enterprise. The host system 350 will typically be a corporate office or other local area network (LAN), but may also be a home office computer system or some other private system, for example, in variant implementations. In the example shown in FIG. 4, the host system 350 is depicted as a LAN of an organization to which a user of the communications device 100 belongs. Typically, a plurality of communications devices can communicate wirelessly with the host system 350 through one or more nodes 302.

The host system 350 comprises a number of network components connected to each other by the LAN connections 460. For instance, a user's desktop computer 462a with an accompanying cradle 464 for the user's communications device 100 is situated on a LAN connection. The cradle 464 for the communications device 100 can be coupled to the computer 462a by a serial or a Universal Serial Bus (USB) connection, for example. Other user computers 462b are also situated on the LAN 460, and each may or may not be equipped with an accompanying cradle 464 that is suitable for a communications device. The cradle 464 facilitates the loading of information (e.g. PIM data, private symmetric encryption keys to facilitate secure communications between the communications device 100 and the host system 350, etc) from the user computer 462a to the communications device 100, and may be particularly useful for bulk information updates often performed in initializing the communications device 100 for use. The information downloaded to the communications device 100 may include certificates used in the exchange of messages.

It will be understood by persons skilled in the art that the user computers 462a, 462b, 462c will typically also be connected to other peripheral devices, such as printers, etc. which are not explicitly shown in FIG. 4. Furthermore, only a subset of network components of the host system 350 are shown in FIG. 4 for ease of exposition, and it will be understood by persons skilled in the art that the host system 350 will comprise additional components that are not explicitly shown in FIG. 4 for this exemplary configuration. More generally, the host system 350 may represent a smaller part of a larger network (not shown) of the organization, and may comprise different components and/or be arranged in different topologies than that shown in the exemplary embodiment of FIG. 4.

In this exemplary embodiment, the communications device 100 communicates with the host system 350 through node 302 of the wireless network 200 and a shared network infrastructure 324 such as a service provider network or the public Internet. Access to the host system 350 may be provided through one or more routers (not shown), and computing devices of the host system 350 may operate from behind a firewall or proxy server 466. The proxy server 466 provides a secure node and a wireless Internet gateway for the host system 350. The proxy server 466 intelligently routes data to the correct destination server.

In some implementations, the host system 350 can include a wireless VPN router (not shown) to facilitate data exchange between the host system 350 and the communications device 100. The wireless VPN router allows a VPN connection to be established directly through a specific wireless network to the communications device 100. The wireless VPN router can be used with the Internet Protocol (IP) Version 6 (IPV6) and IP-based wireless networks. This protocol can provide enough IP addresses so that each communications device has a dedicated IP address, making it possible to push information to a communications device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the communications device 100 in this alternative implementation.

Messages intended for a user of the communications device 100 are initially received by a message server 468 of the host system 350. Such messages may originate from any number of sources. For instance, a message may have been sent by a sender from the computer 462b within the host system 350, from a different communications device (not shown) connected to the wireless network 200 or to a different wireless network, or from a different computing device or other device capable of sending messages, via the shared network infrastructure 324, possibly through an application service provider (ASP) or Internet service provider (ISP), for example.

The message server 468 typically acts as the primary interface for the exchange of messages, particularly email messages, within the organization and over the shared network infrastructure 324. Each user in the organization that has been set up to send and receive messages is typically associated with a user account managed by the message server 468. Some exemplary implementations of the message server 468 include a Microsoft Exchange™ server, a Lotus Domino™ server, a Novell Groupwise™ server, or another suitable mail server installed in a corporate environment. In some implementations, the host system 350 may comprise multiple message servers 468. The message server 468 may also be adapted to provide additional functions beyond message management, including the management of data associated with calendars and task lists, for example.

When messages are received by the message server 468, they are typically stored in a data store associated with the message server 468. In some embodiments, the data store may be a separate hardware unit (not shown) that the message server 468 communicates with. Messages can be subsequently retrieved and delivered to users by accessing the message server 468. For instance, an email client application operating on a user's computer 462a may request the email messages associated with that user's account stored on the data store associated with the message server 468. These messages are then retrieved from the data store and stored locally on the computer 462a. The data store associated with the message server 468 can store copies of each message that is locally stored on the communications device 100. Alternatively, the data store associated with the message server 468 can store all of the messages for the user of the communications device 100 and only a smaller number of messages can be stored on the communications device 100 to conserve memory. For instance, the most recent messages (in the past two to three months for example) can be stored on the communications device 100.

When operating the communications device 100, the user may wish to have email messages retrieved for delivery to the handheld. An email client application operating on the communications device 100 may also request messages associated with the user's account from the message server 468. The email client may be configured (either by the user or by an administrator, possibly in accordance with an organization's information technology (IT) policy) to make this request at the direction of the user, at some pre-defined time interval, or upon the occurrence of some pre-defined event. In some implementations, the communications device 100 is assigned its own email address, and messages addressed specifically to the communications device 100 are automatically redirected to the communications device 100 as they are received by the message server 468.

To facilitate the wireless communication of messages and message-related data between the communications device 100 and components of the host system 350, a number of wireless communication support components 470 may be provided. In some implementations, the wireless communication support components 470 can include a message management server 472, a mobile data server 474, a contact server 476, a password policy module 478, an anti-spam module 479, and the like.

The message management server 472 can be used to specifically provide support for the management of messages, such as email messages, that are to be handled by communications devices. Generally, while messages are still stored on the message server 468, the message management server 472 can be used to control when, if, and how messages are sent to the communications device 100. The message management server 472 also facilitates the handling of messages composed on the communications device 100, which are sent to the message server 468 for subsequent delivery.

For example, the message management server 472 may monitor the user's "mailbox" (e.g. the message store associated with the user's account on the message server 468) for new email messages, and apply user-definable filters to new messages to determine if and how the messages are relayed to the user's communications device 100. The message management server 472 may also compress and encrypt new messages (e.g. using an encryption technique such as Data Encryption Standard (DES) or Triple DES) and push them to the communications device 100 via the shared network infrastructure 324 and the wireless network 200. The message management server 472 may also receive messages composed on the communications device 100 (e.g. encrypted using Triple DES), decrypt and decompress the composed messages, re-format the composed messages if desired so that they will appear to have originated from the user's computer 462a, and re-route the composed messages to the message server 468 for delivery.

Certain properties or restrictions associated with messages that are to be sent from and/or received by the communications device 100 can be defined (e.g. by an administrator in accordance with IT policy) and enforced by the message management server 472. These may include whether the communications device 100 may receive encrypted and/or signed messages, minimum encryption key sizes, whether outgoing messages must be encrypted and/or signed, and whether copies of all secure messages sent from the communications device 100 are to be sent to a pre-defined copy address, for example.

The message management server 472 may also be adapted to provide other control functions, such as only pushing certain message information or pre-defined portions (e.g. "blocks") of a message stored on the message server 468 to the communications device 100. For example, in one instance, when a message is initially retrieved by the communications device 100 from the message server 468, the message management server 472 may push only the first part of a message to the communications device 100, with the part being of a pre-defined size (e.g. 2 KB). The user can then request more of the message, to be delivered in similar-sized blocks by the message management server 472 to the communications device 100, possibly up to a maximum predefined message size. Accordingly, the message management server 472 facilitates better control over the type of data and the amount of data that is communicated to the communications device 100, and can help to minimize potential waste of bandwidth or other resources.

The mobile data server 474 encompasses any other server that stores information that is relevant to the corporation. The mobile data server 474 may include, but is not limited to, databases, online data document repositories, customer relationship management (CRM) systems, or enterprise resource planning (ERP) applications.

The contact server 476 can provide information for a list of contacts for the user in a similar fashion to the address book 142 on the communications device 100. Accordingly, for a given contact, the contact server 476 can include the name, phone number, work address and email address of the contact, among other information. The contact server 476 can also provide a global address list that contains the contact information for all of the contacts associated with the host system 350.

The IT administrator can use the password policy module 478 to update the password policy by, for example, updating a list of pre-specified forbidden passwords and their symbolic equivalents. The IT administrator can also remotely update the password policy of the communications devices by communicating with the password approval module 138 over the network 200 and updating a local copy of the list of pre-specified forbidden passwords and the list of symbolic equivalents. The local copies of these lists can be stored on the flash memory 108 of the communications device 100. Accordingly, the password policy can be maintained centrally and then communicated to various communications devices 100 using a suitable wireless communication infrastructure such as that described herein. In some embodiments, the wireless communication infrastructure includes a transport stack that contains a set of communication protocols that enables the host system 350 to communicate with the communications device 100. A subset of applications provided by the transport stack can be used to pass IT policy commands to the operating system of the communications device 100 and can be used to provide an updated password policy. Alternatively, in some cases, the password policy update can also be done over a wired connection, such as via the cradle 464, for example.

The anti-spam module 479 may be configured to implement a system and method of managing spam in accordance with various embodiments, and may be configured to communicate and interact with the anti-spam module 137 of communications device 100 (see FIG. 1). The anti-spam module 479 may also communicate and interact with one or more of the message server 468, message management server 472, mobile data server 474, and contact server 476 as may be necessary. The function of the anti-spam modules will be described in more detail further below.

Figure 5A:
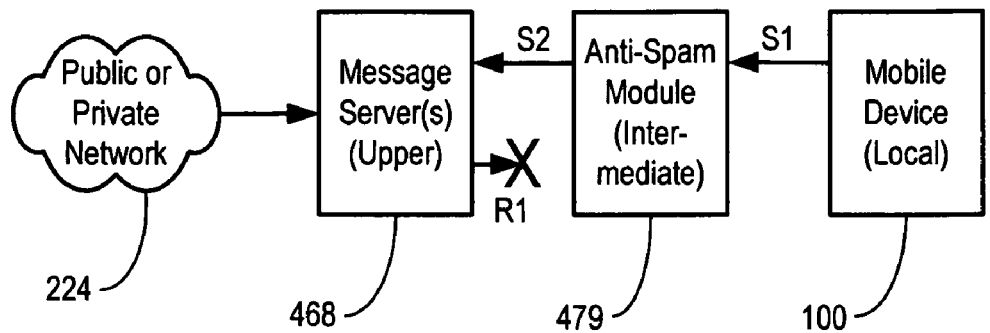
FIGS. 5A to 5C show an illustrative schematic of a multilevel anti-spam system in accordance with an embodiment.

Now referring to FIG. 5A, shown is an illustrative schematic of a multilevel anti-spam system in accordance with an embodiment. More generally FIG. 5A shows an incoming email message stream, starting upstream with a public or private network 224 through which various email messages may be received. As shown, these messages may be first received at a message server 468. Message server 468 may in turn be configured to forward email messages downstream to wireless communication support components 470 including an anti-spam module 479. The wireless communication support components 470 may be further configured to forward email messages downstream to communications device 100.

As previously noted, communications device 100 also includes an anti-spam module 137 configured to implement a system and method for managing spam in accordance with an embodiment, and configured to interact with anti-spam module 479.

Message server 468 may also include an anti-spam module 469 to implement an anti-spam system and method for managing spam messages received from the public or private network 224. Alternatively, message server 468 may rely on a firewall server (such as firewall server 466 of FIG. 4).

Still referring to FIG. 5A, message server 468, anti-spam module 479, and communications device 100 represent three filter levels in a multilevel anti-spam system: an Upper level, an Intermediate level, and a Local level (local from the viewpoint of the user of communications device 100).

Still referring to FIG. 5A, a number of steps may be involved in implementing an anti-spam method. First, a user of communications system 100 may prepare and send an anti-spam request S1 to anti-spam module 479. According to the anti-spam level in the received anti-spam request S1, anti-spam module 479 in turn may send an anti-spam request S2 to anti-spam module 469 in message server 468. Thus, anti-spam module 479 may perform a relay function.

Based on the anti-spam request made to anti-spam module 469, forwarding of email messages from message server 468 to wireless communication support components 470 may be blocked at R1.

Figure 5B:
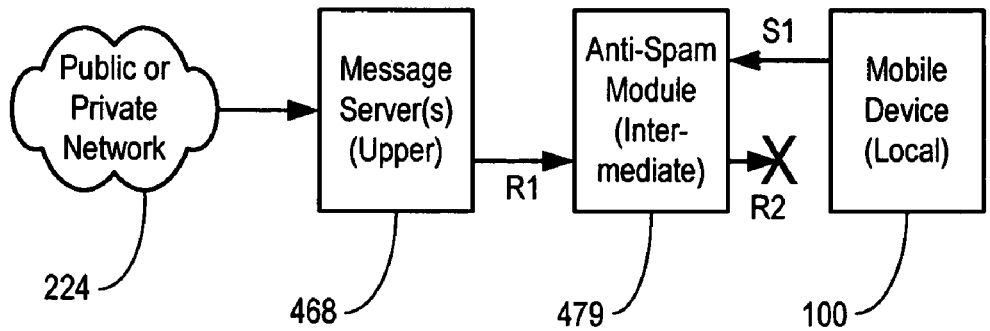

Now referring to FIG. 5B, in an alternative configuration, a user of communications system 100 may communicate an anti-spam request S1 to anti-spam module 479, but no further anti-spam request may be communicated to anti-spam module 469 in message server 468. In this case, email messages received at message server 468 are downloaded to wireless communication support components 470, and handled by message management server 472 for preparation to transmit to communications device 100. However, anti-spam module 479 is now responsible for implementing anti-spam request S1, and may block an attempt by message management server 472 to forward a spam message to communications device 100 at R2.

Figure 5C:
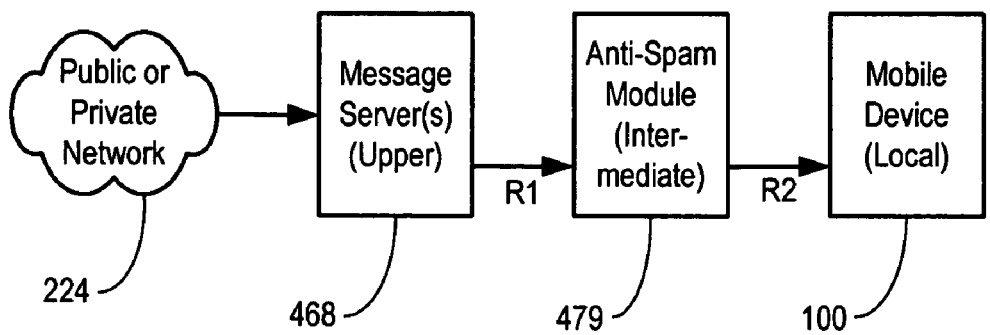

Finally, in the configuration shown in FIG. 5C, with no anti-spam request communicated upstream from the user of communications device 100, email messages may be forwarded to communications device 100 without filtering for spam messages. Such spam messages may be automatically deleted by anti-spam module 137 in communications device 100, as detailed further below.

As will be explained below, the multilevel configuration of the anti-spam system illustrated in FIGS. 5A to 5C may be used to balance the amount of anti-spam activity carried out at different filter levels according to various predetermined criteria.

Figure 6:
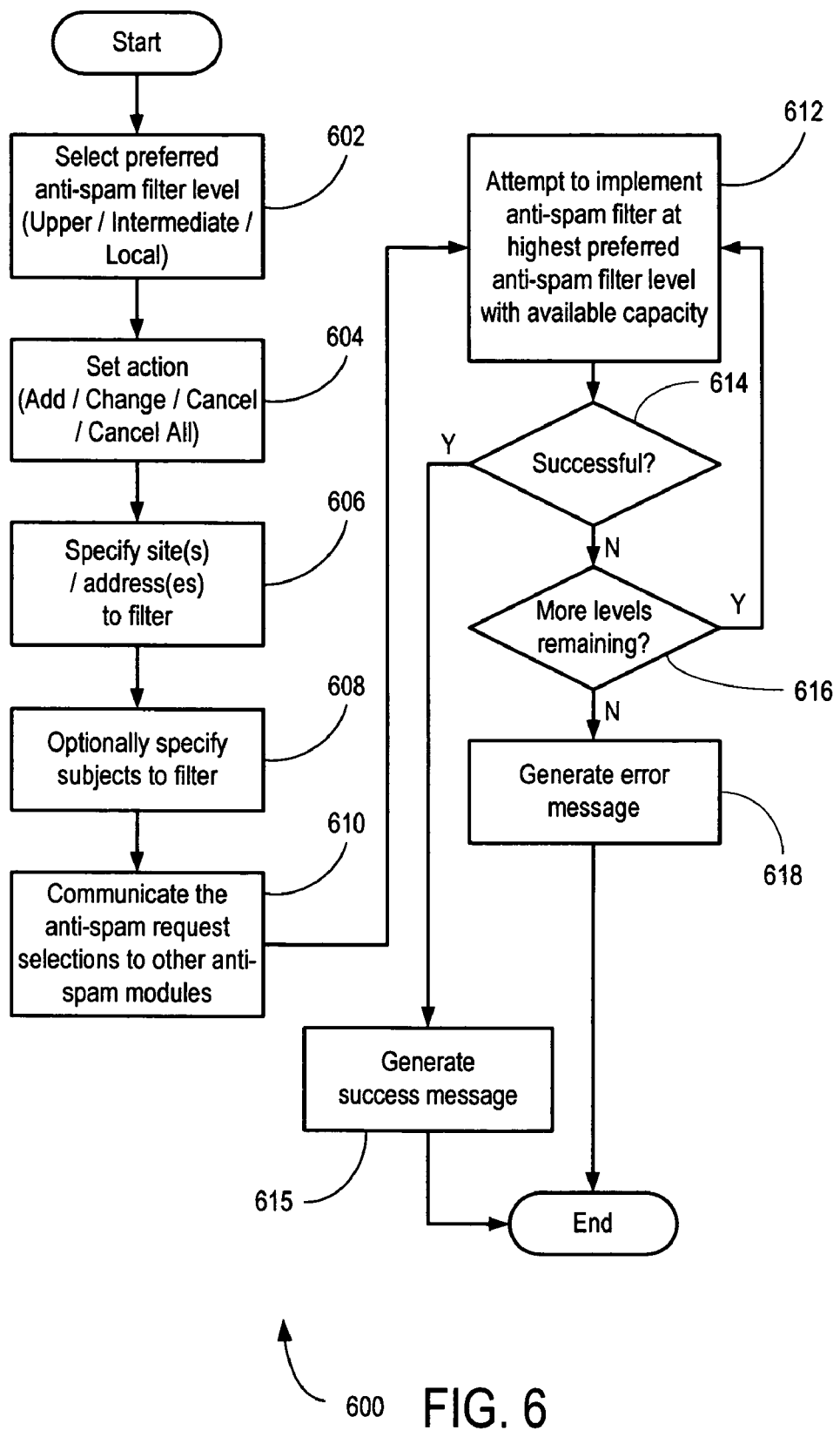
FIG. 6 shows a flowchart of a method in accordance with an embodiment.

Now referring to FIG. 6, shown is a flowchart of a method 600 in accordance with an embodiment. Method 600 begins and at block 602 may require a user (e.g. the user of communications device 100) to select a preferred anti-spam filter level. The anti-spam filter level in this case determines the preferred level at which spam messages are filtered. For example, the possible anti-spam filter levels may be: Upper, Intermediate, and Local. These different filter levels may correspond to the anti-spam module 469 in message server 468, the anti-spam module 479 in the wireless communication support components 470, and the anti-spam module 137 in communications device 100, respectively.

Method 600 may then proceed to block 604, where method 600 may require the user to select an action. For example, the available actions may be: Add, Change, Cancel, and Cancel All, where Add may denote that a new anti-spam address is being added, Change may denote that an existing anti-spam request is being updated with different parameters, Cancel may denote that a previously issued anti-spam request is being cancelled, and Cancel All may denote that multiple addresses at the specified anti-spam filter level are to be cancelled. This last option may be useful if there are too many out-of-date anti-spam requests set at the Upper level on anti-spam module 469, at the Intermediate level on anti-spam module 279, or at the Local level on module 137 inside communications device 100. Cancel All when initiated by the user at the Local level can be configured to be always successful. Cancel All for Intermediate and Upper levels may be limited to the anti-spam requests made by the particular user, and may undergo other confirmation checks to make sure that anti-spam filters for other users are not affected.

Method 600 may then proceed to block 606, where the user may be required to specify the site(s) or address(es) to be filtered.

Optionally, at block 608, method 600 may allow the user to specify any subjects that should be filtered by the selected anti-spam module.

At block 610, method 600 communicates the selected anti-spam request selections to upstream anti-spam modules.

At block 612, method 600 attempts to implement the anti-spam request at the highest preferred filter level selected in block 602.

At decision block 614, method 600 tests whether the anti-spam request has been successfully implemented at the selected anti-spam filter level. If yes, method 600 proceeds to block 615 to generate a success message and ends. If no, method 600 proceeds to decision block 616 to test whether there are any remaining filter levels. If yes, method 600 returns to block 612 to attempt to implement the anti-spam request at the next highest anti-spam filter level with available capacity. Method 600 repeats until, at block 616, it is determined that there are no more filter levels. In a case where the anti-spam request cannot be successfully implemented by any of the filter levels, method 600 may generate an error message at block 618 and end.

Figure 7A:
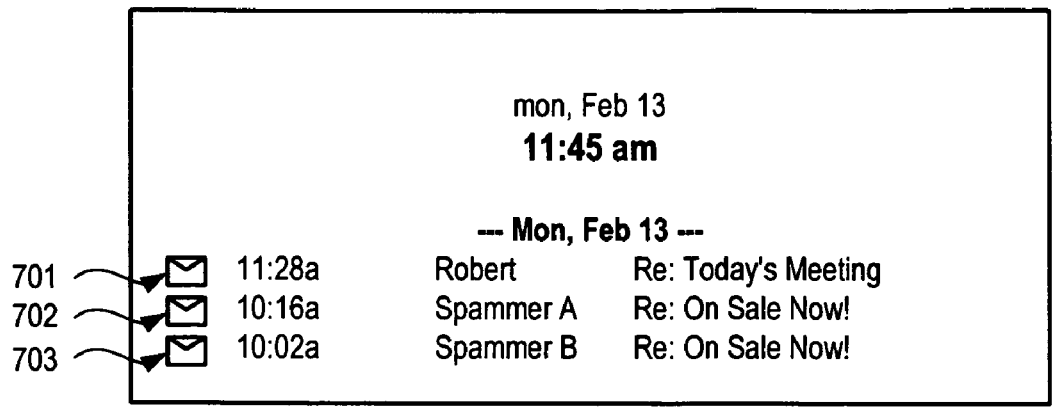
FIGS. 7A to 7C show an illustrative example of a spam message received and a user interface for making anti-spam requests.

FIG. 7A shows an illustrative example of a display 700A showing messages 701, 702, 703 received (e.g. at communications device 100), and which includes two spam messages 702, 703. To deal with these spam messages, the user may interact with a user interface provided on communications device 100 to select various anti-spam request options. It will be appreciated that this user interface and corresponding protocol may be programmed and stored in communications device 100 (e.g. as anti-spam module 137 for example).

Figure 7B:
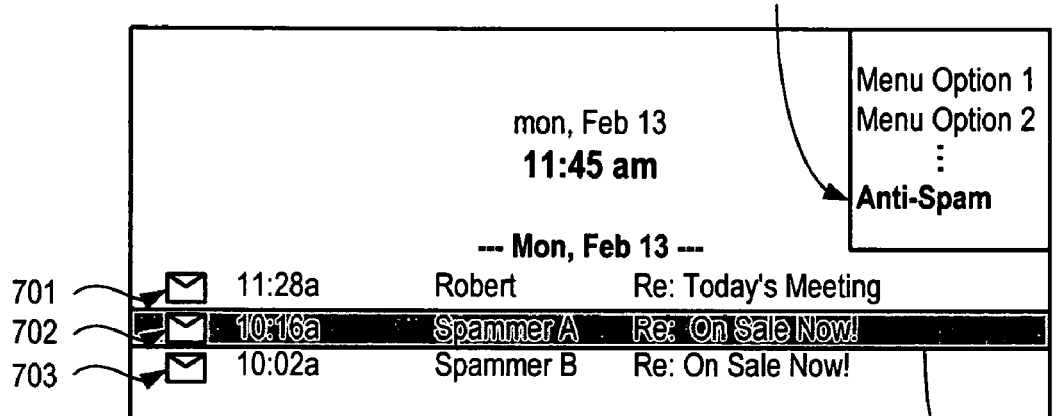
Figure 7C:
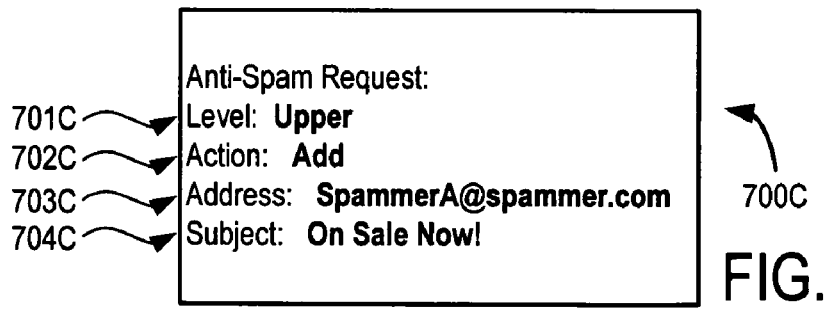

For example, FIG. 7B shows in display 700B how a user may select one of the spam messages 702 by highlighting 710. Another action taken by the user may prompt a pop-up menu 720 to appear, with one of the selectable opens being an "anti-spam" option. This selection may prompt another window 700C to appear which allows the user to specify certain options. In an illustrative embodiment, upon selection of the "anti-spam" menu option by the user, anti-spam module 137 may be configured to automatically initiate a pre-population of the fields in window 700C by executing a routine that reads the appropriate fields of the highlighted spam message. The pre-populated fields in display 700C may then be confirmed by the user, or changed to further specify the user's anti-spam preferences.

Figure 8A:
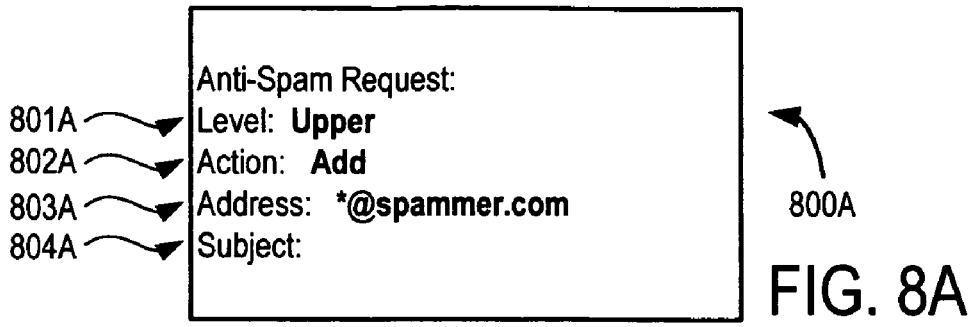

Now referring to FIGS. 8A to 8G, shown are illustrative user interface screens for selecting options for anti-spam requests in accordance with various embodiments. FIG. 8A shows a number of fields 801A to 804A that may be completed by a user. In this illustrative example, the fields are anti-spam filter level 801A, anti-spam action 802A, anti-spam address 803A, and anti-spam subject 804A.

Corresponding to block 602 of FIG. 6, anti-spam filter level 801A may allow the user to select one of Upper, Intermediate, and Local. Corresponding to block 604, anti-spam action 802A may allow the user to select one of Add, Change and Cancel. Corresponding to block 606, anti-spam address 803A may allow the user to enter a site or address to be filtered, or to enter multiple addresses which are separated by a predefined delimiter (e.g. a comma "," or semi-colon ";") or by appropriate spacing (e.g. one address per line). Corresponding to block 608, anti-spam subject 804A may allow the user to optionally enter a subject to filter. Other optional fields may also be provided. For example, another field (not shown) may be an anti-spam reference ID field to indicate spam email that may be related.

Still referring to FIG. 8A, upon completing or selecting options in the fields, the user may complete the anti-spam request by initiating communication of the anti-spam request to upstream anti-spam modules (e.g. as per block 610 of method 600). Given that the user has selected an anti-spam filter level 801A of Upper, with reference back to FIG. 5A, the anti-spam request will be communicated upstream to anti-spam module 469 of message server 468.

Upon receipt of the anti-spam request, anti-spam module 469 will attempt to implement the anti-spam request at the level of message server 468, so that spam messages are blocked before they can reach the wireless communication support components 470 and Intermediate anti-spam module 479. A suitable time limit and/or a limit on the number of attempts (e.g. 60 seconds, 3 tries) may be specified within which the attempt must be successful.

If the anti-spam request is successfully implemented at anti-spam module 469, a success confirmation message may be sent to the user via message management server 472. In the illustrative example, from this point forward, all emails from addresses ending with "@spammer.com" is filtered at anti-spam module 469 and will not make it any further downstream (i.e. will be blocked at R1 as shown in FIG. 5A). If the anti-spam request is implemented at the Upper filter level, the spam messages also will not be forwarded to any LAN connected desktop computers 462a-462c (see. FIG. 4).

If anti-spam module 469 on message server 468 is not implemented due to any particular predetermined criterion (e.g. a performance limit, email administrator action, etc.), the anti-spam request may be communicated to the next lower filter level (i.e. at anti-spam module 479 of the Intermediate wireless communication support components 470) and another attempt may be made to process the anti-spam request. Again, a suitable time limit and/or a limit on the number of attempts (e.g. 30 seconds, 2 tries) may be specified.

If, at anti-spam module 479, the anti-spam request is successfully implemented, a success confirmation message may be sent to the user via message management server 472. From this point forward, all emails from addresses ending with "@spammer.com" should be filtered at anti-spam module 479 and not make it any further downstream to the communications device 100 (i.e. blocked at R2 as shown in FIG. 5B). In this case, however, as the anti-spam filter has been set at an Intermediate filter level, spam messages are not filtered at the message server 468 filter level, and may therefore be forwarded to LAN connected desktop computers 462a-462c.

If the anti-spam request is not successfully implemented at anti-spam module 479, then the next filter level would be the Local filter level at communications device 100. In this case, spam emails are received by LAN connected desktop computers 462a-462c, and by communications device 100.

In communications device 100, anti-spam module 137 may execute locally to filter all received email, and to automatically discard any email identified as spam without further user intervention. In an embodiment, anti-spam module 137 may be suitably configured to prevent spam messages from being stored in local memory any longer than is necessary to be identified as spam and deleted. This may effectively prevent the user from seeing any spam messages in his email inbox on the communications device 100.

Figure 8B:
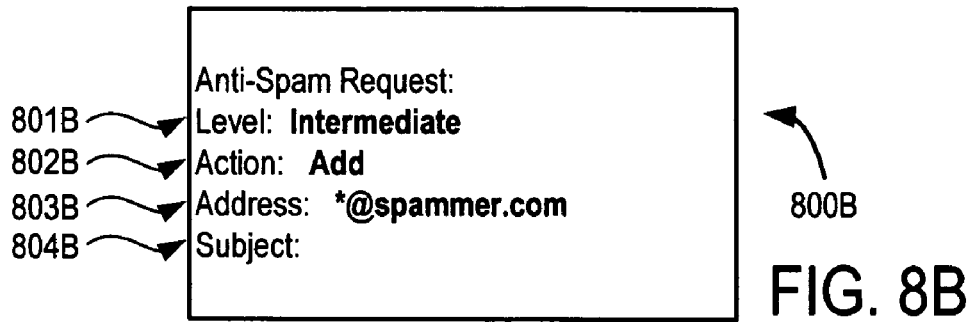
Figure 8C:
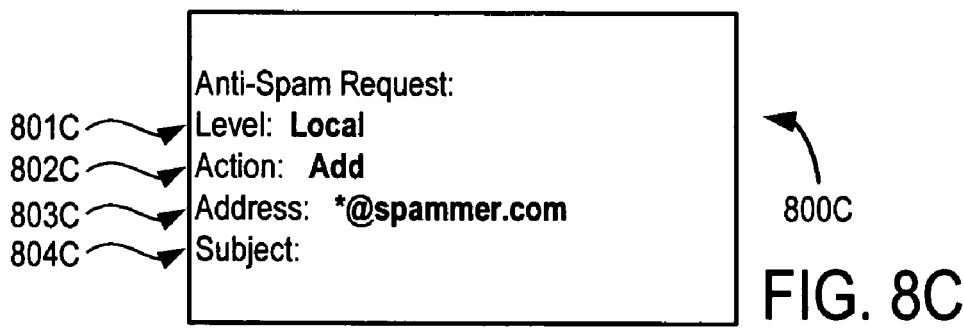

Now referring to FIGS. 8B and 8C, shown are alternative anti-spam requests that may be made by a user at communications device 100. For example, FIG. 8B identifies an anti-spam filter level 801B of Intermediate, which causes the Intermediate anti-spam module 479 to be the filter level to attempt to implement the anti-spam request.

FIG. 8C shows an anti-spam filter level 801C of Local, which causes the Local anti-spam module 137 to be the filter level to attempt to implement the anti-spam request.

In an embodiment, as described above, some or all of the fields 801A-804A, 801B-804B, 801C-804C, may be automatically pre-populated based on fields in the spam messages that have been received at communications device 100.

Figure 8D:
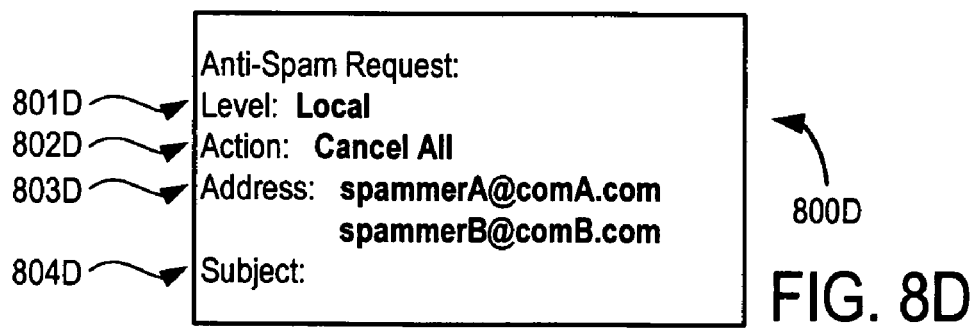
Figure 8E:
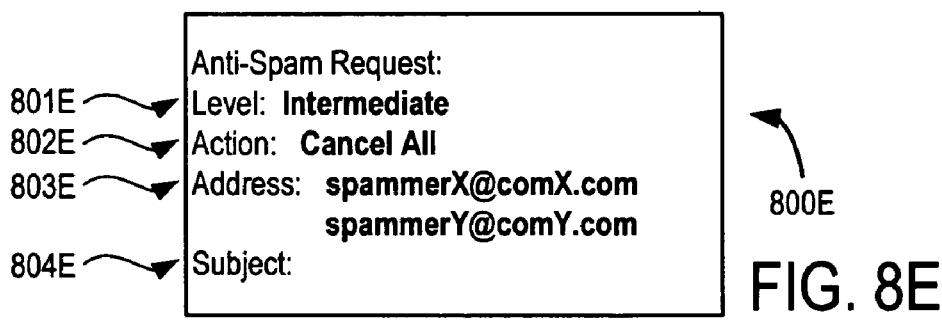
Figure 8F:
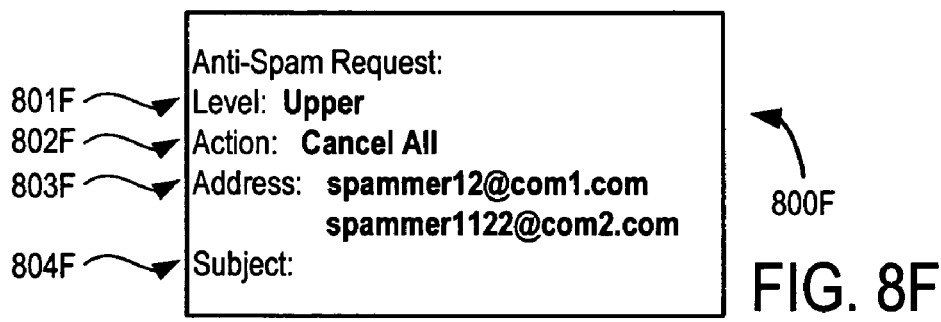

Now referring to FIGS. 8D to 8F, shown are further alternative anti-spam requests that may be made by a user at communications device 100. At any one of the Local, Intermediate and Upper anti-spam filter levels, as specified at 801D, 801E and 801F, the user may indicate a Cancel All action (802D, 802E, 802F) which will cancel previous anti-spam requests. This may be done for a certain list of specified addresses (803D, 803E, 803F), or for all addresses previously specified by the user.

In an embodiment, a list of current filters may be made available to the user. As shown by way of example in FIG. 8G, a list of current filters may provide a summary count of filters set up by the user at the Local, Intermediate, and Upper filter levels, as well as a listing of the addresses being filtered and their filter level. The time and date the filter was set up may also be provided.

In some cases, rather than being user initiated, an anti-spam request may sometimes be initiated by a network or email administrator. In such cases, any anti-spam filters set up at the Upper filter level, for example, may be communicated to the Intermediate and Local filter levels for reference.

Generally speaking, in order to limit the number of spam messages processed by the multilevel anti-spam system, the default anti-spam filter level is selected to be the uppermost filter level with available capacity. Thus in the present illustrative example, if all filter levels have available capacity, the load may be handled primarily by the Upper filter level.

As capacity at the Upper filter level is consumed, factors other than available capacity may be used. For example, if a long incoming message queue is forming at the anti-spam filter in the Upper filter level, it may be necessary to rebalance the load by implementing some of the anti-spam filtering functions at the Intermediate filter level. This may also be preferable where, for example, suspected spam messages must be reviewed more carefully to determine if any of them may be legitimate.

Figure 9:
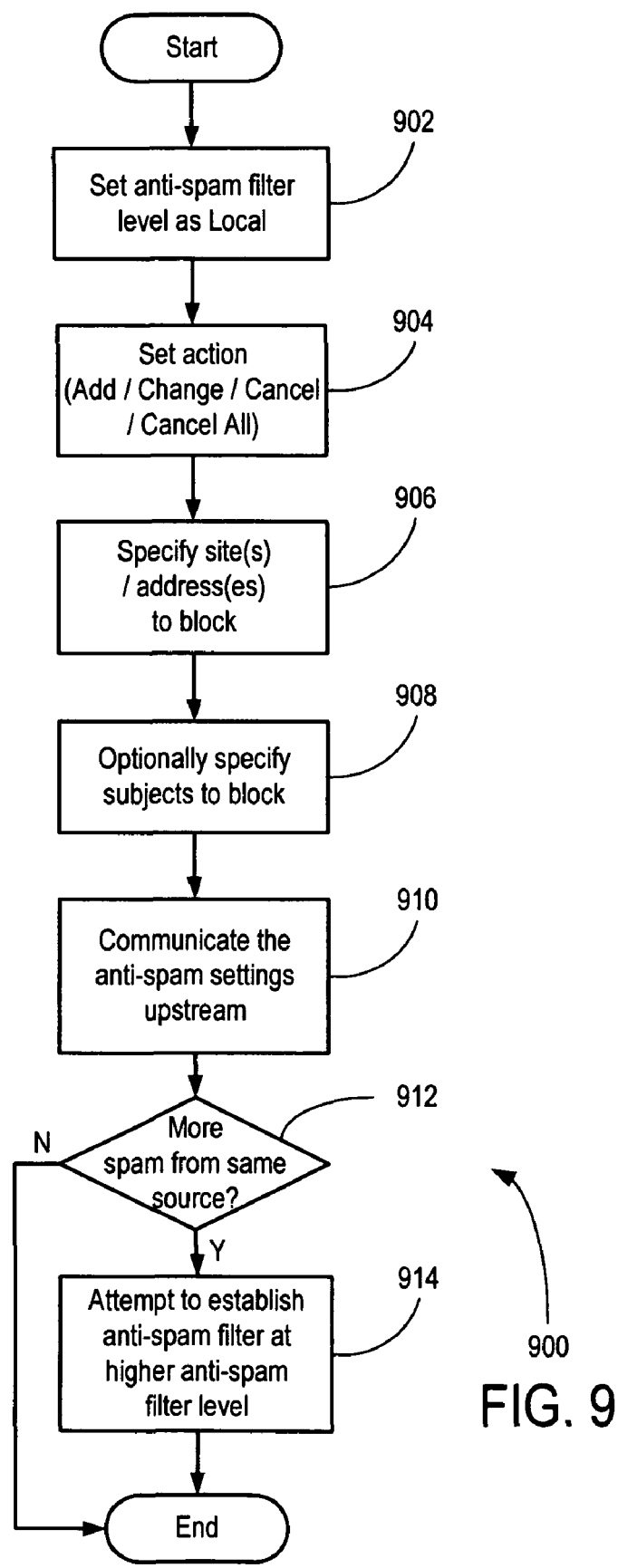
FIG. 9 shows a flowchart of a method in accordance with another embodiment.

Now referring to FIG. 9, shown is a flowchart of a method 900 in accordance with another embodiment. In method 900, the anti-spam filter level is set at Local at block 902. At block 904, the anti-spam action is selected to be one of Add, Change, and Cancel. At block 906, the addresses to be filtered are specified. These fields may be pre-populated as previously described, or they may be completed by the user by direct text entry or selection from a menu of options. At block 908, the user may optionally specify the subject to be filtered. At block 910, the anti-spam request settings are communicated upstream to the Intermediate and Upper filter levels.

At decision block 912, method 900 tests whether multiple spam messages appear to have been received from the same source. This may be done, for example, by looking at similarities in the email address (e.g. a common domain name after "@"). If no, method 900 ends. If yes, method 900 proceeds to block 914. At block 914, an attempt may be made to promote the anti-spam filter to a higher filter level, the rationale being that multiple spam messages from similar addresses are better dealt with by broader filtering upstream.

Figure 10:
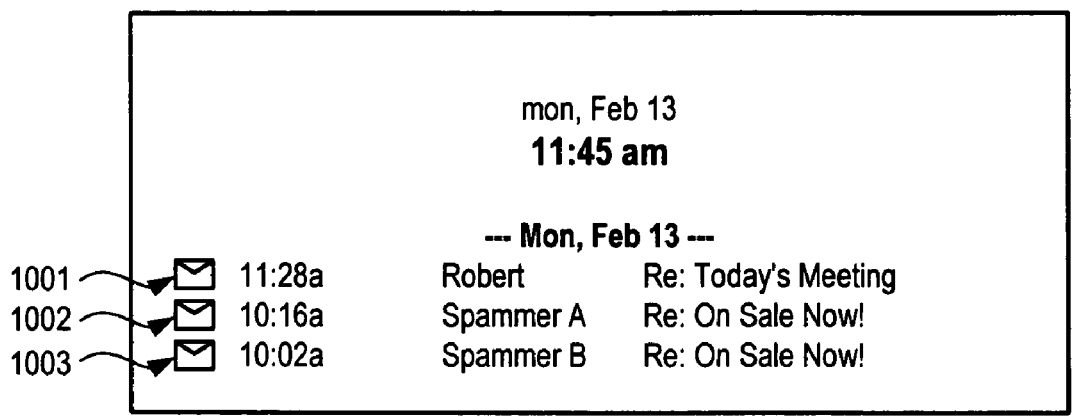
FIG. 10 shows an illustrative example of another display showing spam messages received.

By way of example, FIG. 10 shows a display 1000 with multiple spam messages received. In this illustrative example, messages received from "Spammer A" and "Spammer B" both have the subject "On Sale Now!". This may suggest that the spam messages from both Spammer A and Spammer B are from the same source.

Figure 11A:
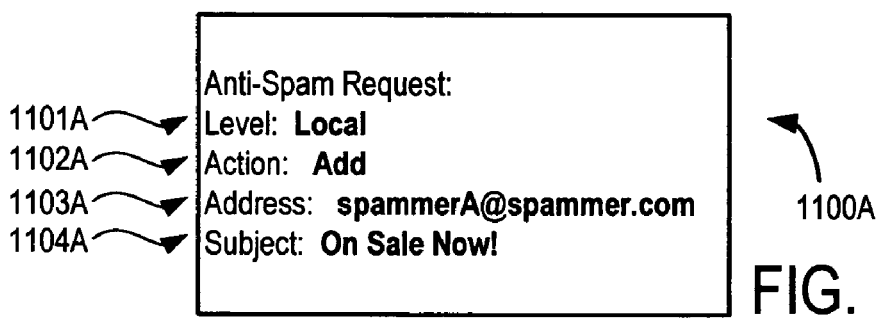
FIGS. 11A to 11C show illustrative user interface screens for making anti-spam requests in accordance with another embodiment.
Figure 11B:
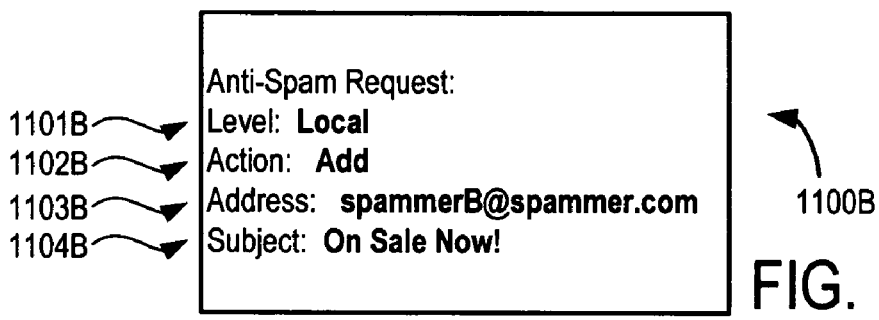
Figure 11C:
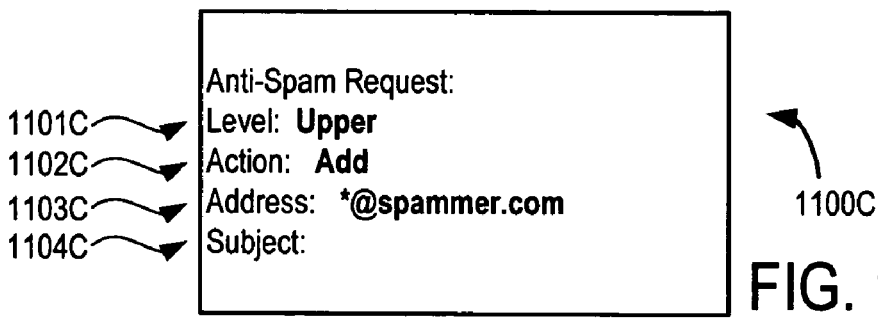

For each of the spam messages 1002 and 1003, as shown in FIGS. 11A and 11B, fields 1101A-1104A and 1101B-1104B may be automatically pre-populated with the anti-spam filter level, the anti-spam action, the address, and the subject. In an embodiment, anti-spam module 137 may be suitably configured to compare the fields and recognize, for example, that multiple anti-spam requests have been made to filter the same subject. As well, anti-spam module 137 may be suitably configured to recognize that the actual email address of Spammer A and Spammer B have a portion of the address (e.g. the domain name portion "@spammer.com") in common. In this case, as shown in FIG. 11C, anti-spam module 137 may be configured to propose the consolidation of the anti-spam request for implementation at the Upper filter level by using a more generic filter with a wildcard character (e.g. "*@spammer.com"). The threshold for making this proposal may be adjusted as desired. For example, instead of commonality between just two spam messages, three or more spam messages with email addresses containing a particular domain name may trigger the proposal to promote the anti-spam filtering to a higher filter level. Also, a reasonable minimum length may be specified for the common portions (e.g. 3 or 4 characters) so that commonality is not frequently found between two totally unrelated addresses or subjects.

It will be appreciated that this multilevel anti-spam system provides considerable flexibility in determining at which filter level the anti-spam filter is implemented.

Thus, in an aspect, there is provided a computer-implemented method for managing spam within an email message stream, comprising: defining a plurality of anti-spam filter levels, each anti-spam filter level including at least one anti-spam module configurable for filtering spam messages; generating an anti-spam request, the anti-spam request including a preferred anti-spam filter level; communicating the anti-spam request to the preferred anti-spam filter level; implementing the anti-spam request on at least one anti-spam module in the preferred anti-spam filter level based on at least one predetermined criterion.

In an embodiment, the method further comprises, if the anti-spam request cannot be implemented at the preferred anti-spam filter level, implementing the anti-spam request on at least one anti-spam module at another anti-spam filter level based on at least one predetermined criterion.

In another embodiment, the at least one predetermined criterion is available processing capacity, and the method further comprises implementing the anti-spam request at the uppermost anti-spam filter level having at least one anti-spam module with available processing capacity.

In another embodiment, the method further comprises generating the anti-spam request upon user confirmation of a proposed anti-spam request automatically generated from a received spam message.

In another embodiment, the method further comprises generating the anti-spam request based on one of user selection and user input.

In still another embodiment, implementing the anti-spam request comprises processing an anti-spam action on an anti-spam address and any optional anti-spam subject specified in the anti-spam request, the anti-spam action being one of add, change, and cancel.

In another embodiment, the method further comprises: at a given anti-spam filter level, comparing anti-spam addresses and any optional anti-spam subjects from at least two anti-spam requests; determining if any anti-spam addresses or any optional anti-spam subjects have common portions of minimal length; if there are any common portions of minimal length in at least one of the anti-spam addresses or anti-span subjects, then proposing consolidation of the relevant anti-spam requests at a higher anti-spam filter level if available.

In another aspect, there is provided a system for managing spam within an email message stream, comprising: a plurality of anti-spam filter levels, each anti-spam filter level including at least one anti-spam module configurable for filtering spam messages; anti-spam request means for generating an anti-spam request, the anti-spam request including a preferred anti-spam filter level; means for communicating the anti-spam request to the preferred anti-spam filter level; means for implementing the anti-spam request on at least one anti-spam module in the preferred anti-spam filter level based on at least one predetermined criterion.

In an embodiment, the system further comprises means for implementing the anti-spam request on at least one anti-spam module at another anti-spam filter level based on at least one predetermined criterion if the anti-spam request cannot be implemented at the preferred anti-spam filter level.

In another embodiment, the at least one predetermined criterion is available processing capacity, and the system further comprises means for implementing the anti-spam request at the uppermost anti-spam filter level having at least one anti-spam module with available processing capacity.

In another embodiment, the system further comprises means for generating the anti-spam request upon user confirmation of a proposed anti-spam request automatically generated from a received spam message.

In another embodiment, the system further comprises means for generating the anti-spam request based on one of user selection and user input.

In another embodiment, the system further comprises means for implementing the anti-spam request comprises means for processing an anti-spam action on an anti-spam address and any optional anti-spam subject specified in the anti-spam request, the anti-spam action being one of add, change, and cancel.

In yet another embodiment, the system further comprises means for comparing anti-spam addresses and any optional anti-spam subjects from at least two anti-spam requests at a given anti-spam filter level; means for determining if any anti-spam addresses or any optional anti-spam subjects have common portions of minimal length; means for proposing consolidation of the relevant anti-spam requests at a higher anti-spam filter level if there are any common portions of minimal length in at least one of the anti-spam addresses or anti-spam subjects.

In still another aspect, there is provided a computer readable medium storing computer code that, when loaded into a computing device, adapts the device to manage spam within an email message stream, the computer readable medium including: code for defining a plurality of anti-spam filter levels, each anti-spam filter level including at least one anti-spam module configurable for filtering spam messages; code for generating an anti-spam request, the anti-spam request including a preferred anti-spam filter level; code for communicating the anti-spam request to the preferred anti-spam filter level; code for implementing the anti-spam request on at least one anti-spam module in the preferred anti-spam filter level based on at least one predetermined criterion.

In an embodiment, the computer readable medium further includes code for implementing the anti-spam request on at least one anti-spam module at another anti-spam filter level based on at least one predetermined criterion, if the anti-spam request cannot be implemented at the preferred anti-spam filter level.

In another embodiment, the computer readable medium further includes code for implementing the anti-spam request at the uppermost anti-spam filter level having at least one anti-spam module with available processing capacity.

In another embodiment, the computer readable medium further includes code for generating the anti-spam request upon user confirmation of a proposed anti-spam request automatically generated from a received spam message.

In another embodiment, the computer readable medium further includes code for generating the anti-spam request based on one of user selection and user input.

In yet another embodiment, the computer readable medium further includes code for implementing an anti-spam action on an anti-spam address and any optional anti-spam subject specified in the anti-spam request, the anti-spam action being one of add, change, and cancel.

In still another embodiment, the computer readable medium further includes code for comparing anti-spam addresses and any optional anti-spam subjects from at least two anti-spam requests at a given anti-spam filter level; code for determining if any anti-spam addresses or any optional anti-spam subjects have common portions of minimal length; code for proposing consolidation of the relevant anti-spam requests at a higher anti-spam filter level if there are any common portions of minimal length in at least one of the anti-spam addresses or anti-spam subjects.

While illustrative embodiments have been described above, it will be appreciated that various changes and modifications may be made. More generally, the scope of the invention is defined by the following claims.

What is claimed is:

1. A computer-implemented method for managing spam within an email message stream directed from a server to a communications device, comprising:

defining a plurality of anti-spam filter levels with at least one anti-spam filter level at each one of the server and the communications device and including at least one anti-spam module configurable for filtering spam messages;

generating an anti-spam request at the communications device, the anti-spam request including a preferred anti-spam filter level;

communicating the anti-spam request to the preferred anti-spam filter level from the communication device;

implementing the anti-spam request at the preferred anti-spam filter level based on at least one predetermined criterion; and determining if the anti-spam request cannot be implemented at the preferred anti-spam filter level and, if it is determined that the anti-spam request cannot be implemented at the preferred anti-spam level, implementing the anti-spam request at the uppermost anti-spam filter level having at least one anti-spam module with available processing capacity.

2. The computer-implemented method of claim 1, further comprising generating the anti-spam request upon user confirmation of a proposed anti-spam request automatically generated from a received spam message.

3. The computer-implemented method of claim 1, further comprising generating the anti-spam request based on one of user selection and user input.

4. The computer-implemented method of claim 1, wherein implementing the anti-spam request comprises processing an anti-spam action on an anti-spam address and any anti-spam subject specified in the anti-spam request, the anti-spam action being one of add, change, and cancel.

5. The computer-implemented method of claim 4, further comprising:

at a given anti-spam filter level, comparing anti-spam addresses and any anti-spam subjects from at least two anti-spam requests;

determining if any anti-spam addresses or any optional anti-spam subjects have common portions of minimal length;

if there are any common portions of minimal length in at least one of the anti-spam addresses or anti-spam subjects, then proposing consolidation of the relevant anti-spam requests at a higher anti-spam filter level if available.

6. A system for managing spam within an email message stream directed from a server to a communications device, comprising:

a plurality of anti-spam filter levels with at least one anti-spam filter level at each one of the server and the communications device and including at least one anti-spam module configurable for filtering spam messages;

anti-spam request means for generating an anti-spam request at the communications device, the anti-spam request including a preferred anti-spam filter level;

means for communicating the anti-spam request to the preferred anti-spam filter level from the communication device;

means for implementing the anti-spam request on at least one anti-spam module in the preferred anti-spam filter level based on at least one predetermined criterion; and means for determining if the anti-spam request cannot be implemented at the preferred anti-spam level and, if it is determined that the anti-spam request cannot be implemented at the preferred anti-spam level, implementing the anti-spam request at the uppermost anti-spam filter level having at least one anti-spam module with available processing capacity.

7. The system of claim 6, further comprising means for generating the anti-spam request upon user confirmation of a proposed anti-spam request automatically generated from a received spam message.

8. The system of claim 6, further comprising means for generating the anti-spam request based on one of user selection and user input.

9. The system of claim 6, wherein the means for implementing the anti-spam request comprises means for processing an anti-spam action on an anti-spam address and any anti-spam subject specified in the anti-spam request, the anti-spam action being one of add, change, and cancel.

10. The system of claim 9, further comprising:

means for comparing anti-spam addresses and any anti-spam subjects from at least two anti-spam requests at a given anti-spam filter level;

means for determining if any anti-spam addresses or any anti-spam subjects have common portions of minimal length;

means for proposing consolidation of the relevant anti-spam requests at a higher anti-spam filter level if there are any common portions of minimal length in at least one of the anti-spam addresses or anti-spam subjects.

11. A non-transitory computer readable medium comprising code that, when loaded into a computing device, adapts the device to manage spam within an email message stream directed from a server to a communications device, the non-transitory computer readable medium including:

code for defining a plurality of anti-spam filter levels with at least one anti-spam filter level at each one of the server and the communications device and including at least one anti-spam module configurable for filtering spam messages;

code for generating in response to a selection an anti-spam request at the communications device, the anti-spam request including a preferred anti-spam filter level;

code for communicating the anti-spam request to the preferred anti-spam filter level from the communication device;

code for implementing the anti-spam request on at least one anti-spam module in the preferred anti-spam filter level based on at least one predetermined criterion; and code for determining if the anti-spam request cannot be implemented at the preferred anti-spam filter level and, if it is determined that the anti-spam request cannot be implemented at the preferred anti-spam level, implementing the anti-spam request at the uppermost anti-spam filter level having at least one anti-spam module with available processing capacity.

12. The non-transitory computer readable medium of claim 11, further including code for generating the anti-spam request upon user confirmation of a proposed anti-spam request automatically generated from a received spam message.

13. The non-transitory computer readable medium of claim 11, further including code for generating the anti-spam request based on one of user selection and user input.

14. The non-transitory computer readable medium of claim 11, further including code for implementing an anti-spam action on an anti-spam address and any anti-spam subject specified in the anti-spam request, the anti-spam action being one of add, change, and cancel.

15. The non-transitory computer readable medium of claim 11, further including:

code for comparing anti-spam addresses and any anti-spam subjects from at least two anti-spam requests at a given anti-spam filter level;

code for determining if any anti-spam addresses or any anti-spam subjects have common portions of minimal length;

code for proposing consolidation of the relevant anti-spam requests at a higher anti-spam filter level if there are any common portions of minimal length in at least one of the anti-spam addresses or anti-spam subjects.

* * * * *